(12) United States Patent
Kim et al.

(10) Patent No.: US 11,353,373 B2
(45) Date of Patent: Jun. 7, 2022

(54) STRAIN GAUGE PATTERN TO PREVENT VARIATION DUE TO TEMPERATURE

(71) Applicant: STMicroelectronics Asia Pacific Pte Ltd, Singapore (SG)

(72) Inventors: Min Sang Kim, Anyang-si (KP); Chan Hyuck Yun, Yongin-si (KP); Sa Hyang Hong, Seoul (KP); Ju Hyun Son, Seoul (KP)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 118 days.

(21) Appl. No.: 16/887,352

(22) Filed: May 29, 2020

(65) Prior Publication Data
US 2021/0372867 A1     Dec. 2, 2021

(51) Int. Cl.
*G01L 1/00* (2006.01)
*G01L 1/22* (2006.01)

(52) U.S. Cl.
CPC .......... *G01L 1/2262* (2013.01); *G01L 1/2281* (2013.01)

(58) Field of Classification Search
CPC .......................... G01L 1/2262; G01L 1/2281
See application file for complete search history.

(56) References Cited

U.S. PATENT DOCUMENTS

| | | | |
|---|---|---|---|
| 7,398,688 B2 | 7/2008 | Zdeblick et al. | |
| 10,631,400 B1 * | 4/2020 | Tsai | G01L 1/2287 |
| 2002/0092364 A1 * | 7/2002 | Adderton | G01L 5/162 |
| | | | 73/862.41 |
| 2010/0223797 A1 * | 9/2010 | Peczalski | G01B 7/30 |
| | | | 33/355 R |
| 2018/0128883 A1 * | 5/2018 | Stute | H01L 25/10 |
| 2018/0172739 A1 * | 6/2018 | Raberg | G01R 15/205 |
| 2018/0365466 A1 * | 12/2018 | Shim | G06K 9/0004 |
| 2019/0317641 A1 * | 10/2019 | Maruyama | G01L 1/205 |

FOREIGN PATENT DOCUMENTS

| | | |
|---|---|---|
| JP | 2018132433 A | 8/2018 |
| JP | 2019060810 A | 4/2019 |
| KR | 20190126953 A | 11/2019 |
| TW | 201324297 A1 | 6/2013 |
| TW | I492130 B | 7/2015 |

\* cited by examiner

*Primary Examiner* — Max H Noori
(74) *Attorney, Agent, or Firm* — Crowe & Dunlevy

(57) ABSTRACT

A strain gauge includes first and second substrates spaced apart from one another. A first flexible printed circuit board portion is in contact with a top side of the first and second substrates, and has a first Wheatstone bridge formed therein. The first flexible printed circuit board portion positions the first Wheatstone bridge such that two resistors of the first Wheatstone bridge are positioned to span from the top side of the first substrate to the top side of the second substrate. A second flexible printed circuit board portion is in contact with a bottom side of the first and second substrates, and has a second Wheatstone bridge formed therein. The second flexible printed circuit board positions the second Wheatstone bridge such that two resistors of the second Wheatstone bridge are positioned to span from the bottom side of the first substrate to the bottom side of the second substrate.

18 Claims, 5 Drawing Sheets

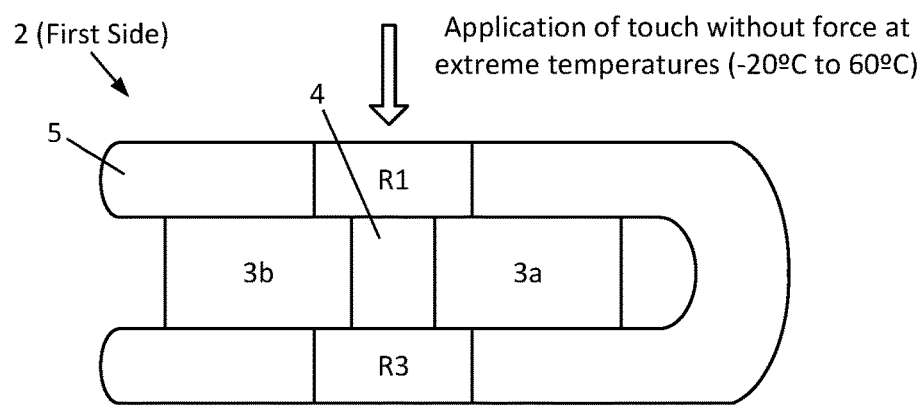
FIG. 1C
Prior Art
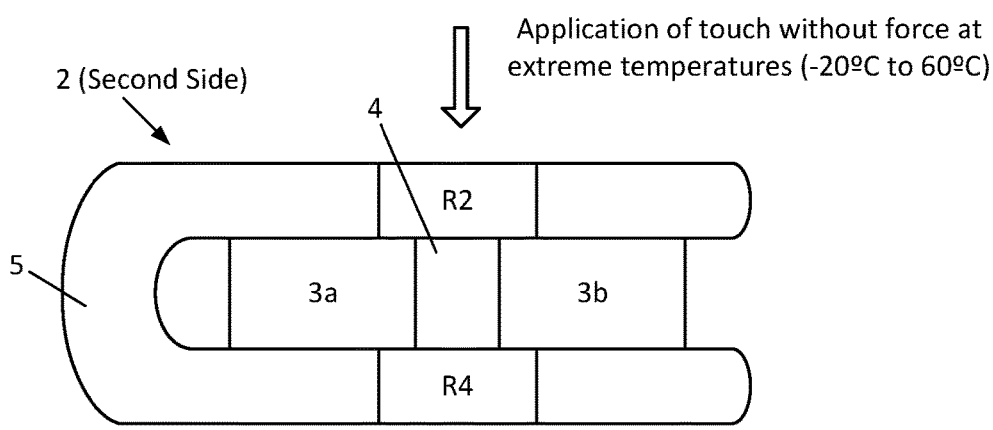
FIG. 1D
Prior Art
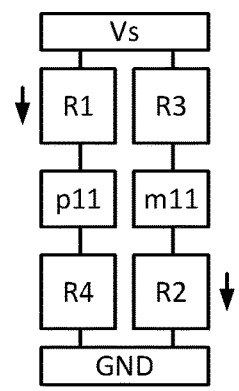

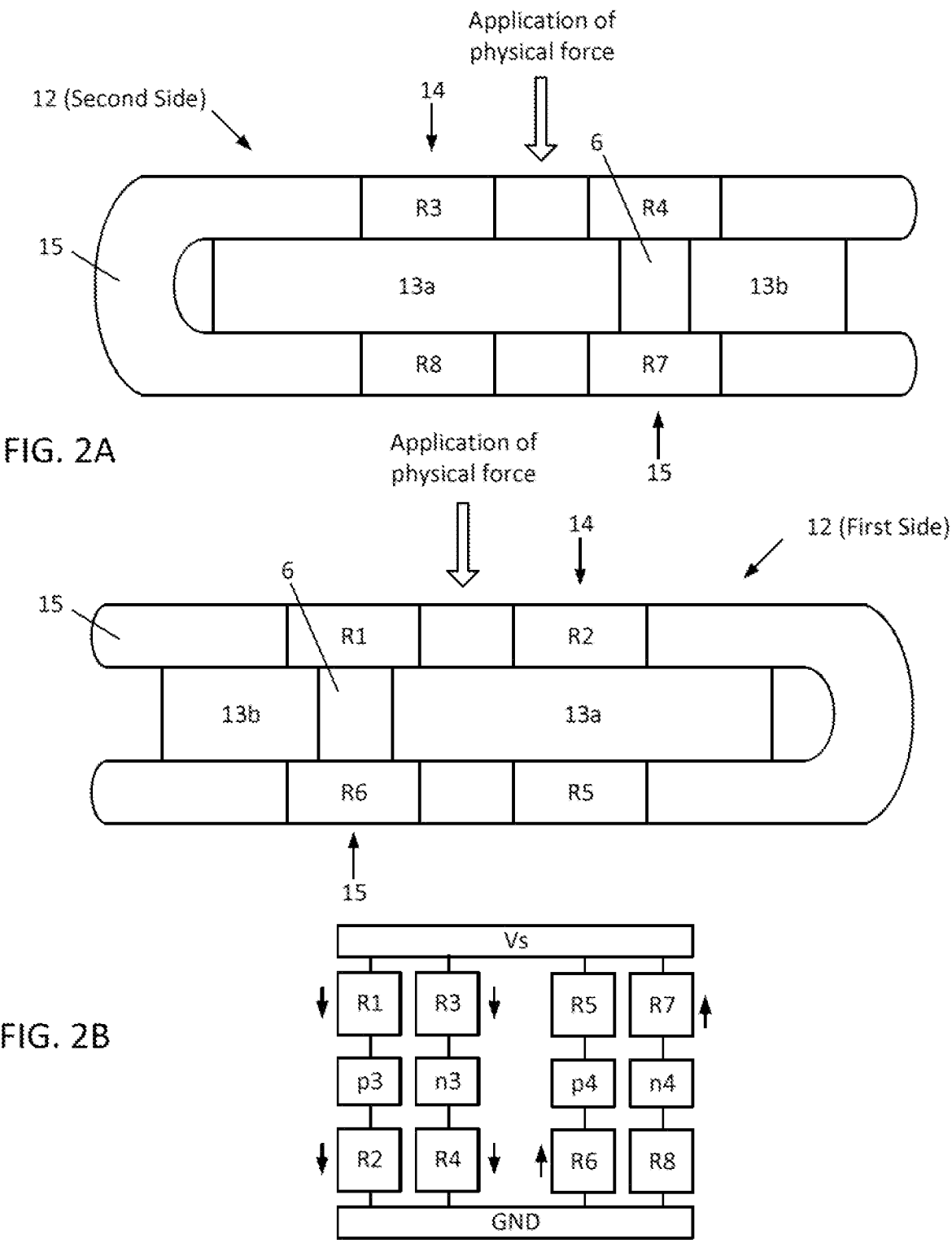

STRAIN GAUGE PATTERN TO PREVENT VARIATION DUE TO TEMPERATURE

TECHNICAL FIELD

This disclosure is related to the field of strain gauge sensors, and in particular, to a strain gauge sensor formed from a pattern of resistors providing the strain gauge sensor with the ability to provide consistent readings over a range of operating temperatures.

BACKGROUND

Touch screens are widely utilized in smartphones, smartwatches, tablets, and laptops. A touch screen is typically formed in layers, with a display layer (for displaying content and prompts for user input) overlaid by a touch matrix which uses capacitive sensing to receive said user input.

In some instances, it may be desired for a certain area of the touch screen to be sensitive to not only touch itself, but also to the pressure of the touch. This may be used, for example, to provide for a "virtual" home button or volume control button or AI key, without the requirement of a physical button that would consume area on the top, left, or right face of the device that could otherwise be occupied by the touch screen. To facilitate this functionality, strain gauges may be incorporated within such touch screens. It is expected that by replacing the physical key, the device design will be improved.

A sample dual sided strain gauge 2 is shown in FIG. 1A and electrically depicted in FIG. 1B, where it can be seen that the dual sided strain gauge 2 is comprised of a Wheatstone bridge 4 formed within a flexible printed circuit board (FPCB) 5 that is bent about two spaced apart substrates 3a and 3b. The dual sided strain gauge 2 can be positioned within any suitable or desired device.

The Wheatstone bridge 4 is comprised of resistors R1 and R2 positioned adjacent a top surface of the substrates 3a and 3b, and resistors R3 and R4 positioned on a bottom surface of the substrates 3a and 3b. Note that the resistors R1-R4 are all positioned so as to extend across the space 4 between the substrates 3a and 3b to enable the FPCB 5 and its Wheatstone bridge 4 to be deformed under stress.

The electrical connections of the Wheatstone bridges 4 are illustrated in FIG. 1B. Here, it can be seen that for the Wheatstone bridge 4, the resistors R1 and R4 are connected in series between a voltage Vs and ground GND by node p1, the resistors R3 and R2 are connected in series between the voltage Vs and ground GND by node n1, and that the series connected resistors R1 and R4 are connected in parallel with the series connected resistors R3 and R2. The nodes p1 and n1 provide outputs for the bridge 4.

When a physical force is applied to top of the dual sided strain gauge 2 in a downward direction, the FPCB 5 is deformed so that the strain on the resistors R1 and R2 changes with respect to the strain on the resistors R3 and R4. The result is a change of the resistance of the resistors R1 and R2 with respect to the resistance of the resistance of the resistors R3 and R3, and a voltage differential between nodes p1 and n1 forms, such that the voltage Vp1−Vn1 is measurable, and from this voltage, the direction of the force applied to the dual sided strain gauge 2 as well as the magnitude of that force can be determined. In cases where a touch is made with a negligible physical force, a minimal voltage differential between nodes p1 and n1 forms, such that the voltage Vp1−Vn1 is negligible; thus, at normal temperature, the dual sided strain gauge 2 is able to differentiate between a touch with physical force and a touch with negligible physical force.

Under normal temperature ranges, this design of dual sided strain gauge 2 generally functions properly. However, a problem arises under temperatures outside of the normal range of operating temperatures (such as extreme cold or extreme heat conditions), as shown in FIGS. 1C-1D.

Under these conditions, regardless of whether or not the FPCB 5 flexes (so, regardless of whether a touch is a touch with pressure or a touch with only contact and without pressure), the voltage differential between nodes p1 and n1 is measurable and similar due to the temperature difference between the user's finger and the ambient temperature of the dual sided strain gauge 2 being sufficient to cause said voltage differential. Therefore, outside of normal operating temperature ranges, the dual sided strain gauge 2 may be unable to differentiate between a touch with negligible physical force and a touch with physical force, rendering the dual sided strain gauge 2 nonfunctional for most of its intended uses (e.g., detecting a touch made with physical force).

Therefore, further development into this area is needed.

SUMMARY

Disclosed herein is an electronic device including a strain gauge. The strain gauge includes: a substrate layer comprised of first and second substrates lying in a same plane but spaced apart from one another, a flexible printed circuit board including first and second Wheatstone bridges, the flexible printed circuit board being wrapped about an end of the substrate layer such that the flexible printed circuit board is in contact with both a top side of the first and second substrates and a bottom side of the first and second substrates. The flexible printed circuit board positions the first Wheatstone bridge such that two resistors of the first Wheatstone bridge are positioned such that these two resistors span from the top side of the first substrate to the top side of the second substrate, and such that remaining resistors of the first Wheatstone bridge are positioned solely on the top side of the first substrate. The flexible printed circuit board positions the second Wheatstone bridge such that two resistors of the second Wheatstone bridge are positioned such that these two resistors span from the bottom side of the first substrate to the bottom side of the second substrate, and such that remaining resistors of the second Wheatstone bridge are positioned solely on the bottom side of the first substrate.

The electronic device may include strain gauge controller configured to: measure a voltage difference between first and second outputs of the first Wheatstone bridge; measure a voltage difference between first and second outputs of the second Wheatstone bridge; and determine a voltage differential between the first and second Wheatstone bridges as a difference between the voltage difference for the first Wheatstone bridge and the voltage difference for the second Wheatstone bridge.

The strain gauge controller may be configured to determine a magnitude and direction of force applied to the strain gauge from the determined voltage differential between the first and second Wheatstone bridges resistors.

The first and second Wheatstone bridges may be coupled between a supply voltage and ground.

The first Wheatstone bridge may be formed from, at least: a first resistor positioned so as to span from the top side of the first substrate to the top side of the second substrate; a second resistor positioned so as to be positioned solely on the top side of the first substrate; a third resistor positioned so as to span from the top side of the first substrate to the top side of the second substrate; and a fourth resistor positioned so as to be positioned solely on the top side of the first substrate. The first and second resistors may be coupled in series between a supply voltage and ground, with the first output of the first Wheatstone bridge being electrically connected between the first and second resistors. The third and fourth resistors may be coupled in series between the supply voltage and ground, with the second output of the first Wheatstone bridge being electrically connected between the third and fourth resistors.

The first and fourth resistors may be positioned physically parallel to one another, and the second and third resistors may be positioned physically parallel to one another.

The second Wheatstone bridge may be formed from, at least: a fifth resistor positioned so as to span from the bottom side of the first substrate to the bottom side of the second substrate; a sixth resistor positioned so as to be positioned solely on the bottom side of the first substrate; a seventh resistor positioned so as to span from the bottom side of the first substrate to the bottom side of the second substrate; and an eighth resistor positioned so as to be positioned solely on the bottom side of the first substrate. The fifth and sixth resistors are coupled in series between a supply voltage and ground, with the first output of the second Wheatstone bridge being electrically connected between the fifth and sixth resistors. The seventh and eighth resistors are coupled in series between the supply voltage and ground, with the second output of the second Wheatstone bridge being electrically connected between the seventh and eighth resistors.

The sixth and seventh resistors may be positioned physically parallel to one another, and the fifth and eighth resistors may be positioned physically parallel to one another.

BRIEF DESCRIPTION OF THE DRAWINGS

FIG. 1C includes side views of the prior art dual sided strain gauge undergoing a touch without force at extreme operating temperatures.

FIG. 1D is a diagrammatical view of the electrical connections of the Wheatstone bridges of the prior art dual sided strain gauge of FIG. 1C.

FIG. 2A includes side views of a dual sided strain gauge disclosed herein undergoing a touch with force at normal operating temperatures.

FIG. 2B is a diagrammatical view of the electrical connections of the Wheatstone bridges of the dual sided strain gauge of FIG. 2A.

DETAILED DESCRIPTION

Figure 1A:
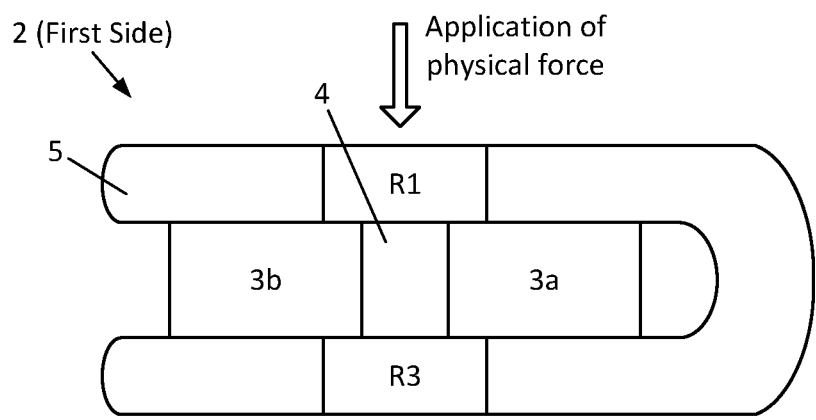
FIG. 1A includes side views of a prior art dual sided strain gauge undergoing a touch with force at normal operating temperatures.
Figure 1B:
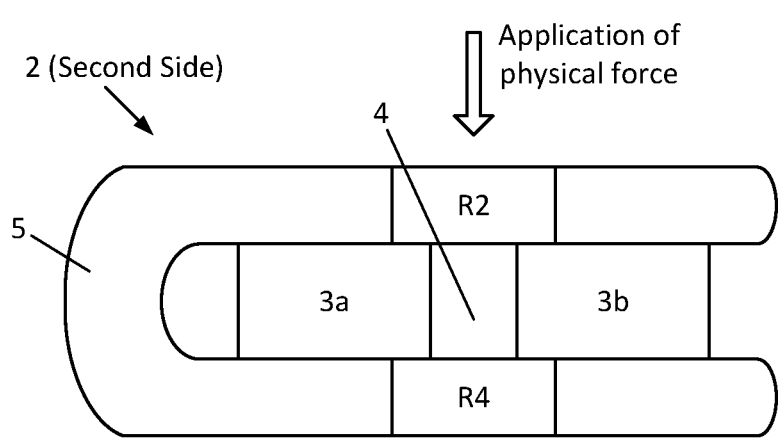
FIG. 1B is a diagrammatical view of the electrical connections of the Wheatstone bridges of the prior art dual sided strain gauge of FIG. 1A.
Figure 1B:
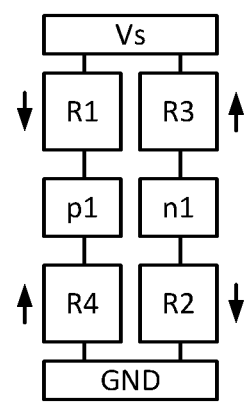

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

A dual sided strain gauge 12 is now described with reference to FIG. 2A, where it can be seen that the dual sided strain gauge 12 is comprised of two Wheatstone bridges 14 and 15 within a flexible printed circuit board (FPCB) 15 positioned about two spaced apart substrates 13a-13b. The free space between the substrates 13a and 13b is illustrated and labeled as reference numeral 6, and it should be noted that no components or layers are contained within the space 6.

The Wheatstone bridge 14 is comprised of resistors R1-R4. In particular, resistors R2 and R3 are positioned entirely on a top surface of the substrate 13a, while resistors R1 and R4 extend between the top surfaces of the substrates 13a and 13b, across the space 6. Similarly, the Wheatstone bridge 15 is comprised of resistors R5-R8. Here, resistors R5 and R8 are positioned entirely on a bottom surface of the substrate 13a, while resistors R6 and R7 extend between the bottom surfaces of the substrates 13a and 13b, across the space 6.

The electrical connections of the Wheatstone bridges 14 and 15 are illustrated in FIG. 2B. Here, it can be seen that for the Wheatstone bridge 14, the resistors R1 and R2 are connected in series between a voltage Vs and ground GND by node p3, that the resistors R3 and R4 are connected in series between the voltage Vs and ground GND by node n3, and that the series connected resistors R1 and R2 are connected in parallel with the series connected resistors R3 and R4. The nodes p3 and n3 are outputs of the Wheatstone bridge 14. Similarly, for the Wheatstone bridge 15, the resistors R5 and R6 are connected in series between the voltage Vs and ground GND by node p4, the resistors R7 and R8 are connected in series between the voltage Vs and ground GND by node n4, and the series connected resistors R5 and R6 are connected in parallel with the series connected resistors R7 and R8. The nodes p4 and n4 are outputs of the Wheatstone bridge 15.

At normal operating temperatures (between 0° C. and 40° C.), as shown in FIG. 2A, under the application of physical force to the top of the dual sided strain gauge 12 in a downward direction, the FPCB 15 is deformed so that the strain on the resistors R1-R4 changes with respect to the strain on the resistors R5-R8. In more detail, the strain on the resistors R1 and R4 changes with respect to the strain on resistors R6 and R7 more than the strain on the resistors R2 and R3 changes with respect to the strain on resistors R5 and R8, due to the fact that the resistors R1, R4, R6, and R7 extend between the substrates 13a and 13b, across the space 6.

The result is a change of the resistance of the resistors R1 and R4 with respect to the resistance of the resistors R2 and R3, and a voltage differential between nodes p3 and n3 forms, such that the voltage Vp3-Vn3 is measurable. Similarly, depending on the location and magnitude of the application of the physical force, there is also a change of resistance of the resistors R6 and R7 with respect to the resistance of the resistors R5 and R8, a formation of a voltage differential between nodes p4 and n4, and a measureable voltage Vp4-Vn4. From the voltages Vp3-Vn3 and Vp4-Vn4, therefore, at normal operating temperatures, the direction of the force applied to the dual sided strain gauge 12 as well as the magnitude of that force can be determined. In cases where a touch is made with a negligible physical force, a minimal voltage differential between nodes p3 and n3, as well as between nodes p4 and n4 forms, such that the voltages Vp3-Vn3 and Vp4-Vn4 are negligible; thus, at normal temperature, the dual sided strain gauge 12 is able to differentiate between a touch with physical force and a touch with negligible physical force.

In particular, a voltage ΔU can be determined, and from this, the aforementioned direction of the force applied to the dual sided strain gauge 12 as well as the magnitude of that force can be determined, through mathematical combination of the voltages at nodes p3 and n3 and the voltages at nodes p4 and n4 to produce ΔU.

Mathematically, ΔU can be calculated by the following:

$$\Delta U1 = Vs*[R2/(R1+R2)]$$

$$\Delta U2 = Vs*[R4/(R3+R4)]$$

$$\Delta U\text{out} = \Delta U1 - \Delta U2$$

$$\Delta U3 = Vs*[R6/(R5+R6)]$$

$$\Delta U4 = Vs*[R8/(R7+R8)]$$

$$\Delta U\text{in} = \Delta U3 - \Delta U4$$

$$\Delta U = \Delta U\text{out} + \Delta U\text{in}$$

Note that extreme operating temperatures (less than 0° C. or greater than 40° C.) do not change the operation of the dual sided strain gauge 12 when experiencing a touch with pressure because the application of force changes the resistance of the resistors R1-R4 with respect to one another and with respect to the resistors R5-R8

Figure 2C:
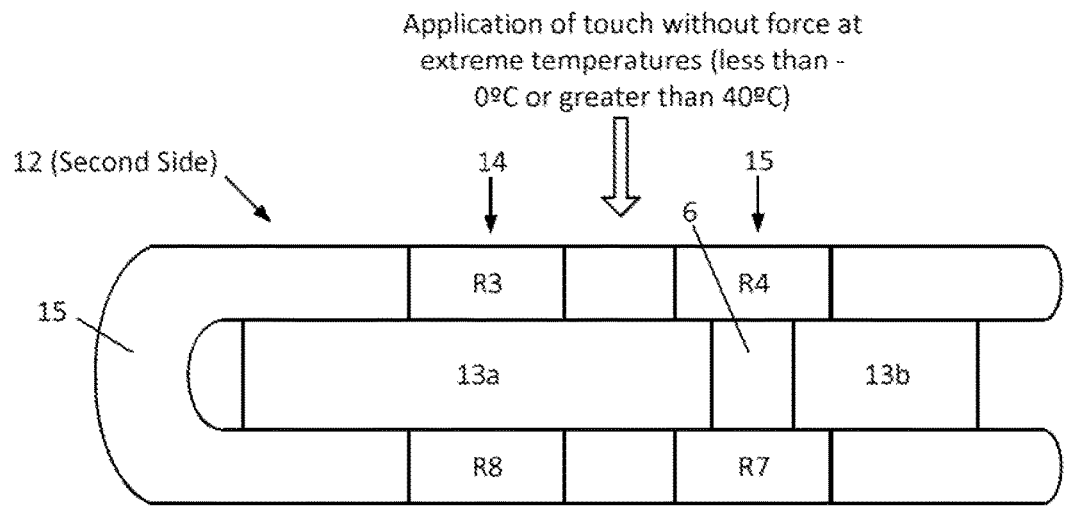
FIG. 2C includes side views of the dual sided strain gauge disclosed herein undergoing a touch without force at extreme operating temperatures.
Figure 2D:
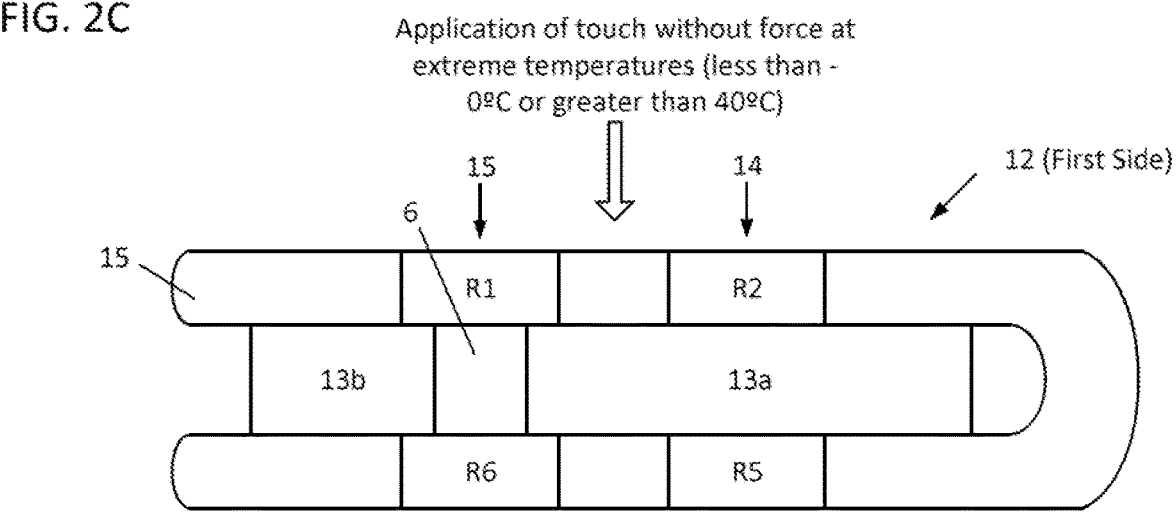
FIG. 2D is a diagrammatical view of the electrical connections of the Wheatstone bridges of the dual sided strain gauge of FIG. 2C.
Figure 2D:
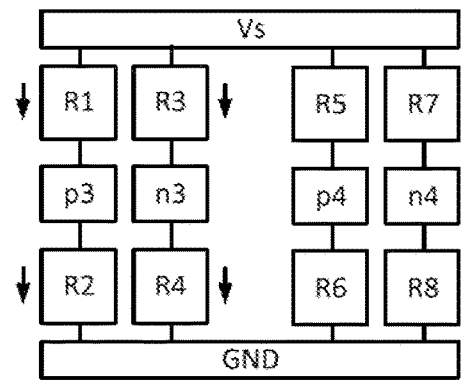

With respect to a touch without downward force being applied, at extreme operating temperatures (less than 0° C. or greater than 40° C.), as shown in FIGS. 2C-2D, when the top of the dual sided strain gauge 12 is touched but without a downward force being applied, the FPCB 15 is not deformed, meaning that the touch does not result in changes to the resistance of the resistors of the Wheatstone bridge 14. Moreover, the transfer of heat from the user's finger (at approximately 36.5° C.) to the Wheatstone bridge 14 is to all of resistors R1-R4, so the changes in resistance to the resistors R1-R4 as a result of heat transfer heating the resistors R1-R4 are similar to one another. Therefore, the voltage differential between nodes n3 and n4 of the Wheatstone bridge 14 is negligible, and thus Vp3-Vn3 is negligible.

Moreover, since the resistors R5 and R8 of the second Wheatstone bridge 15 are positioned on the bottom surface of the substrate 13a and the resistors R6 and R7 extend between the bottom surfaces of the substrates 13a and 13b, the resistors R5-R8 are not subjected to the temperature differential between the user's finger and the ambient temperature of the dual sided strain gauge 12 itself. Therefore, even at extreme operating temperatures, in the absence of force, a touch to the dual sided strain gauge 12 does not result in a change of resistance of the resistors R5-R8, meaning that the voltage Vp4-Vn4 is negligible. The result of this is that ΔU will be negligible (since Vp3-Vn3 is also negligible), and the touch without force can therefore be differentiated from a touch made with force. Even in the case where a non-negligible voltage differential between nodes n3 and p3 forms due to the heat transfer, due to the mathematical combination of Vp3-Vn3 with Vp4-Vn4, the effect of the non-negligible voltage differential between nodes n3 and p3 is lowered so that ΔU will still be sufficiently negligible to be able to distinguish a touch with force from a touch without force.

Figure 3:
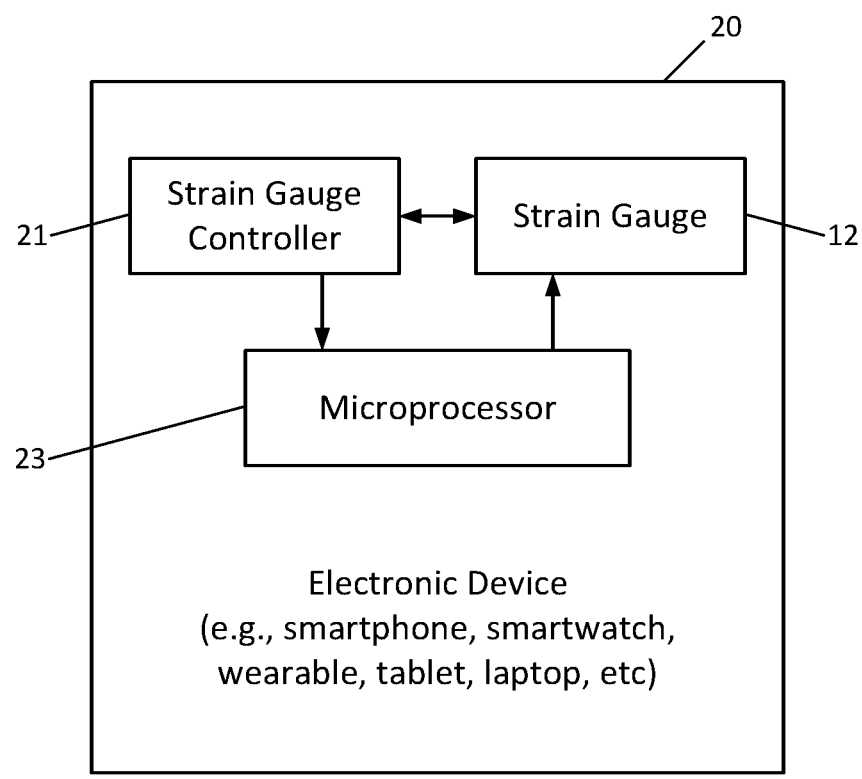
FIG. 3 is a block diagram of an electronic device incorporating the dual sided strain gauge disclosed herein.

The strain gauge 12 described herein can be incorporated with an electronic device 20, such as a smartphone, smartwatch, wearable, tablet, or laptop, as shown in FIG. 3. Indeed, the strain gauge 12 can be incorporated within a touch screen or touch screen of the electronic device 20, or can be incorporated within the housing of the electronic device 20, for example, to create volume buttons, a power button, or a virtual assistant activation button, on the sides or back of the electronic device 20, without the need for conventional physical buttons. The electronic device 20 may include a strain gauge controller 21 for reading the voltage at the nodes Vp3, Vn3 and Vp4, Vn4, calculating ΔU as described above, determining the direction of the force applied to the strain gauge 12 as well as the magnitude of that force from ΔU, and reporting the direction and magnitude of the determined force to a microprocessor 23 within the electronic device 20.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
  a strain gauge comprising:
    a substrate layer comprised of first and second substrates lying in a same plane but spaced apart from one another; and
    a flexible printed circuit board including first and second Wheatstone bridges, the flexible printed circuit board being wrapped about an end of the substrate layer such that the flexible printed circuit board is in contact with both a top side of the first and second substrates and a bottom side of the first and second substrates;
    wherein the flexible printed circuit board positions the first Wheatstone bridge such that two resistors of the first Wheatstone bridge are positioned such that these two resistors span from the top side of the first substrate to the top side of the second substrate, and such that remaining resistors of the first Wheatstone bridge are positioned solely on the top side of the first substrate; and
    wherein the flexible printed circuit board positions the second Wheatstone bridge such that two resistors of the second Wheatstone bridge are positioned such that these two resistors span from the bottom side of the first substrate to the bottom side of the second substrate, and such that remaining resistors of the second Wheatstone bridge are positioned solely on the bottom side of the first substrate.

2. The electronic device of claim 1, further comprising a strain gauge controller configured to:
  measure a first voltage difference between first and second outputs of the first Wheatstone bridge;
  measure a second voltage difference between first and second outputs of the second Wheatstone bridge;
  determine a voltage differential between the first and second Wheatstone bridges as a difference between the first voltage difference and the second voltage difference.

3. The electronic device of claim 2, wherein the strain gauge controller is configured to determine a magnitude and direction of force applied to the strain gauge from the determined voltage differential between the first and second Wheatstone bridges resistors.

4. The electronic device of claim 1, wherein the first and second Wheatstone bridges are coupled between a supply voltage and ground.

5. The electronic device of claim 1, wherein the first Wheatstone bridge comprises:
   a first resistor positioned so as to span from the top side of the first substrate to the top side of the second substrate;
   a second resistor positioned so as to be positioned solely on the top side of the first substrate;
   a third resistor positioned so as to span from the top side of the first substrate to the top side of the second substrate; and
   a fourth resistor positioned so as to be positioned solely on the top side of the first substrate;
   wherein the first and second resistors are coupled in series between a supply voltage and ground, with a first output of the first Wheatstone bridge being electrically connected between the first and second resistors; and
   wherein the third and fourth resistors are coupled in series between the supply voltage and ground, with a second output of the first Wheatstone bridge being electrically connected between the third and fourth resistors.

6. The electronic device of claim 5, wherein the first and fourth resistors are positioned physically parallel to one another; and wherein the second and third resistors are positioned physically parallel to one another.

7. The electronic device of claim 1, wherein the second Wheatstone bridge comprises:
   a fifth resistor positioned so as to span from the bottom side of the first substrate to the bottom side of the second substrate;
   a sixth resistor positioned so as to be positioned solely on the bottom side of the first substrate;
   a seventh resistor positioned so as to span from the bottom side of the first substrate to the bottom side of the second substrate; and
   an eighth resistor positioned so as to be positioned solely on the bottom side of the first substrate;
   wherein the fifth and sixth resistors are coupled in series between a supply voltage and ground, with a first output of the second Wheatstone bridge being electrically connected between the fifth and sixth resistors; and
   wherein the seventh and eighth resistors are coupled in series between the supply voltage and ground, with a second output of the second Wheatstone bridge being electrically connected between the seventh and eighth resistors.

8. The electronic device of claim 7, wherein the sixth and seventh resistors are positioned physically parallel to one another; and wherein the fifth and eighth resistors are positioned physically parallel to one another.

9. A strain gauge, comprising:
   a substrate layer comprised of first and second substrates spaced apart from one another; and
   a first flexible printed circuit board portion in contact with a top side of the first and second substrates, the first flexible printed circuit board portion having a first Wheatstone bridge formed therein;
   wherein the first flexible printed circuit board portion positions the first Wheatstone bridge such that two resistors of the first Wheatstone bridge are positioned so as to span from the top side of the first substrate to the top side of the second substrate; and
   a second flexible printed circuit board portion in contact with a bottom side of the first and second substrates, the second flexible printed circuit board portion having a second Wheatstone bridge formed therein;
   wherein the second flexible printed circuit board portion positions the second Wheatstone bridge such that two resistors of the second Wheatstone bridge are positioned so as to span from the bottom side of the first substrate to the bottom side of the second substrate.

10. The strain gauge of claim 9, wherein the first and second Wheatstone bridges are coupled between a supply voltage and ground.

11. The strain gauge of claim 9, wherein the first Wheatstone bridge comprises:
    a first resistor positioned so as to span from the top side of the first substrate to the top side of the second substrate;
    a second resistor positioned so as to be positioned solely on the top side of the first substrate;
    a third resistor positioned so as to span from the top side of the first substrate to the top side of the second substrate; and
    a fourth resistor positioned so as to be positioned solely on the top side of the first substrate;
    wherein the first and second resistors are coupled in series between a supply voltage and ground, with a first output of the first Wheatstone bridge being electrically connected between the first and second resistors; and
    wherein the third and fourth resistors are coupled in series between the supply voltage and ground, with a second output of the first Wheatstone bridge being electrically connected between the third and fourth resistors.

12. The strain gauge of claim 11, wherein the first and fourth resistors are positioned physically parallel to one another; and wherein the second and third resistors are positioned physically parallel to one another.

13. The strain gauge of claim 9, wherein the second Wheatstone bridge comprises:
    a fifth resistor positioned so as to span from the bottom side of the first substrate to the bottom side of the second substrate;
    a sixth resistor positioned so as to be positioned solely on the bottom side of the first substrate;
    a seventh resistor positioned so as to span from the bottom side of the first substrate to the bottom side of the second substrate; and
    an eighth resistor positioned so as to be positioned solely on the bottom side of the first substrate;
    wherein the fifth and sixth resistors are coupled in series between a supply voltage and ground, with a first output of the second Wheatstone bridge being electrically connected between the fifth and sixth resistors; and
    wherein the seventh and eighth resistors are coupled in series between the supply voltage and ground, with a second output of the second Wheatstone bridge being electrically connected between the seventh and eighth resistors.

14. The strain gauge of claim 13, wherein the sixth and seventh resistors are positioned physically parallel to one another; and wherein the fifth and eighth resistors are positioned physically parallel to one another.

15. An electronic device, comprising:
    a strain gauge comprising:

a substrate layer comprised of first and second substrates lying in a same plane;

a flexible printed circuit board including first and second Wheatstone bridges, the flexible printed circuit board being in contact with both a top side of the first and second substrates and a bottom side of the first and second substrates;

wherein the flexible printed circuit board positions the first Wheatstone bridge such that two resistors of the first Wheatstone bridge are positioned such that these two resistors span from the top side of the first substrate to the top side of the second substrate, and such that remaining resistors of the first Wheatstone bridge are positioned solely on the top side of the first substrate;

wherein the flexible printed circuit board positions the second Wheatstone bridge such that two resistors of the second Wheatstone bridge are positioned such that these two resistors span from the bottom side of the first substrate to the bottom side of the second substrate, and such that remaining resistors of the second Wheatstone bridge are positioned solely on the bottom side of the first substrate;

a strain gauge controller configured to:
measure a first voltage difference between first and second outputs of the first Wheatstone bridge;
measure a second voltage difference between first and second outputs of the second Wheatstone bridge; and
determine a voltage differential between the first and second Wheatstone bridges as a difference between the first voltage difference and the second voltage difference.

16. The electronic device of claim 15, wherein the first Wheatstone bridge comprises:
a first resistor positioned so as to span from the top side of the first substrate to the top side of the second substrate;
a second resistor positioned so as to be positioned solely on the top side of the first substrate;
a third resistor positioned so as to span from the top side of the first substrate to the top side of the second substrate; and
a fourth resistor positioned so as to be positioned solely on the top side of the first substrate.

17. The electronic device of claim 16, wherein the first and fourth resistors are positioned physically parallel to one another; and wherein the second and third resistors are positioned physically parallel to one another.

18. The electronic device of claim 15, wherein the second Wheatstone bridge comprises:
a fifth resistor positioned so as to span from the bottom side of the first substrate to the bottom side of the second substrate;
a sixth resistor positioned so as to be positioned solely on the bottom side of the first substrate;
a seventh resistor positioned so as to span from the bottom side of the first substrate to the bottom side of the second substrate; and
an eighth resistor positioned so as to be positioned solely on the bottom side of the first substrate.

* * * * *